(12) United States Patent
Nakamura et al.

(10) Patent No.: US 8,658,919 B2
(45) Date of Patent: Feb. 25, 2014

(54) MULTI-TOUCH PANEL INCLUDING EQUIPOTENTIAL LINE DISTORTION CORRECTOR

(75) Inventors: Kazuto Nakamura, Kyoto (JP); Yuichiro Takai, Kyoto (JP); Tomohiro Yamaoka, Kyoto (JP); Seiko Hirai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/521,794

(22) PCT Filed: Sep. 8, 2011

(86) PCT No.: PCT/JP2011/070485
§ 371 (c)(1),
(2), (4) Date: Jul. 12, 2012

(87) PCT Pub. No.: WO2012/039290
PCT Pub. Date: Mar. 29, 2012

(65) Prior Publication Data
US 2012/0293298 A1 Nov. 22, 2012

(30) Foreign Application Priority Data
Sep. 22, 2010 (JP) ................................. 2010-212500

(51) Int. Cl.
H01H 9/26 (2006.01)
H01H 13/72 (2006.01)
H01H 13/76 (2006.01)

(52) U.S. Cl.
USPC ........................................................ 200/5 A (58) Field of Classification Search
USPC ................. 200/600, 511, 512, 310–317, 292; 341/22, 33, 34; 345/168–170, 345/173–176, 204; 174/250; 455/575.1; 264/135, 259; 156/60, 230; 29/622; 438/48

See application file for complete search history.

(56) References Cited

U.S. PATENT DOCUMENTS 7,973,771 B2* 7/2011 Geaghan ........................ 345/173
8,304,675 B2* 11/2012 Hsu ............................... 200/512

(Continued)

FOREIGN PATENT DOCUMENTS

JP 61-84730 4/1986
JP 2009-258935 11/2009

(Continued)

OTHER PUBLICATIONS

International Search Report issued Nov. 15, 2011 in corresponding International Application No. PCT/JP2011/070485.

Primary Examiner — Edwin A. Leon
Assistant Examiner — Anthony R. Jimenez
(74) Attorney, Agent, or Firm — Wenderoth, Lind & Ponack, L.L.P.

(57) ABSTRACT

A multi-touch panel includes a first substrate for receiving coordinate input, a second substrate provided to face the first substrate, a first conductive film formed on the first substrate; and a second conductive film formed on the second substrate. At least one of the first conductive film and the second conductive film is divided into a plurality of strip regions to configure a plurality of strip electrodes. At least one end of each of the strip electrodes has a narrowed width portion, and the strip electrodes have widths different from one another at the narrowed width portion in accordance with lengths of the drawing wires that are connected to the ends provided with the narrowed width portions.

6 Claims, 10 Drawing Sheets

(56) References Cited

U.S. PATENT DOCUMENTS

| | | |
|---|---|---|
| 2009/0262095 A1 | 10/2009 | Kinoshita et al. |
| 2011/0199320 A1* | 8/2011 | Cho et al. .................. 345/173 |
| 2012/0050204 A1* | 3/2012 | Kao et al. .................. 345/174 |
| 2012/0081329 A1* | 4/2012 | Kim et al. .................. 345/174 |

FOREIGN PATENT DOCUMENTS

| | | |
|---|---|---|
| JP | 2010-26641 | 2/2010 |
| JP | 2010-55313 | 3/2010 |

\* cited by examiner

MULTI-TOUCH PANEL INCLUDING EQUIPOTENTIAL LINE DISTORTION CORRECTOR

TECHNICAL FIELD

The present invention relates to a multi-touch panel of an analog resistive film type, and more particularly relates to a multi-touch panel that includes an equipotential line distortion corrector for correcting distortion of an equipotential line.

BACKGROUND ART

Multi-touch panels of the analog resistive film type are widely adopted in handheld terminals such as PDAs, OA equipment such as copiers and fax machines, mobile phones, handheld video game machines, vehicle navigation systems, small PCs, and various types of home electrical appliances.

Figure 13:
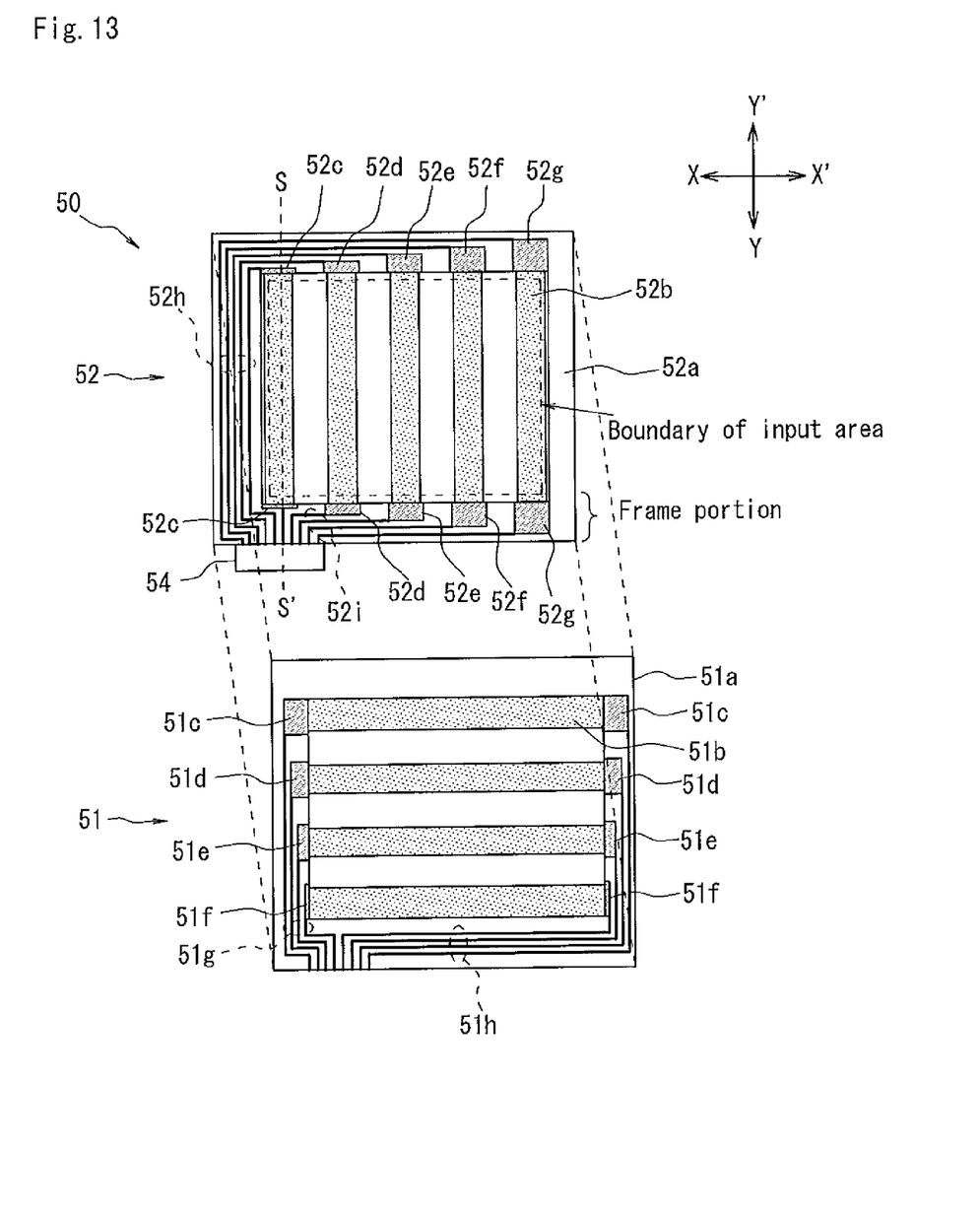
FIG. 13 is an exploded view showing a configuration of a conventional multi-touch panel.

FIG. 13 shows an ordinary configuration of a multi-touch panel of this type.

Figure 14:
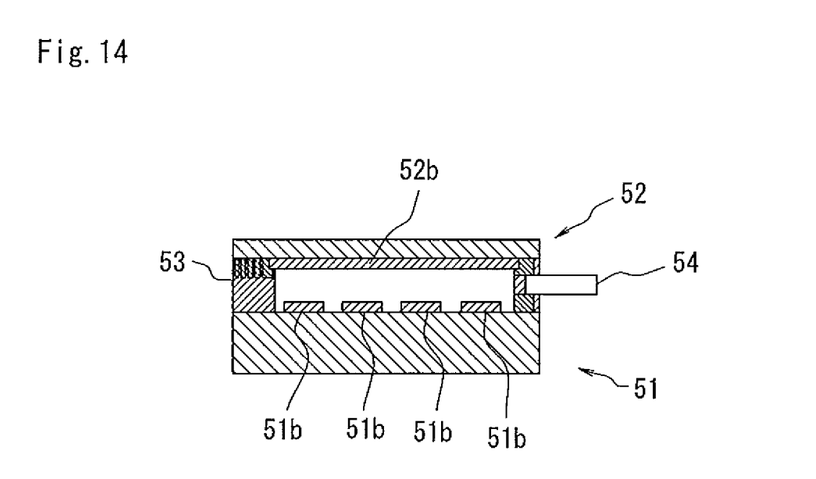
FIG. 14 is a vertical sectional view taken along line S-S' indicated in FIG. 13.

A multi-touch panel 50 shown in this figure includes a lower electrode plate 51 and an upper electrode plate 52 that are provided to face each other, and an insulating adhesive layer 53 (see FIG. 14) which joins peripheral portions of the lower electrode plate 51 and the upper electrode plate 52.

The lower electrode plate 51 has a transparent insulating substrate 51a such as a glass plate, ITO (indium tin oxide) electrodes 51b that are formed on the transparent insulating substrate 51a, and a plurality of paired parallel circuits 51c to 51f that are provided respectively at ends in an X-X' direction of the ITO electrodes 51b. It is noted that parallel circuit referred to in this specification is made by an electrode connected with the ITO strip electrode as shown in FIGS. 1(a) to 6 and FIG. 13.

The upper electrode plate 52, which is to be touched, has a flexible transparent insulating base material 52a such as a polyester film, ITO electrodes 52b that are formed on a lower surface of the flexible transparent insulating base material 52a, and a plurality of paired parallel circuits 52c to 52g that are provided respectively at ends in a Y-Y' direction of the ITO electrodes 52b.

It is noted that FIG. 13 shows a state where distances between the adjacent parallel circuits are enlarged for the purpose of understanding easier the locations of the parallel circuits 51c to 51f and the parallel circuits 52c to 52g, while each of the actual distances between the adjacent parallel circuits is approximately 0.2 mm.

In the lower electrode plate 51, the parallel circuits 51c to 51f and an FPC 54 functioning as an external terminal are connected to each other by wiring circuits 51g and 51h. In the upper electrode plate 52, the parallel circuits 52c to 52g and the FPC 54 are connected to each other by wiring circuits 52h and 52i (refer to Patent Document 1, for example). In the figures, reference signs a to e indicate input areas that are independent from each other.

PRIOR ART DOCUMENT

Patent Document

Patent Document 1: Japanese Unexamined Patent Publication No. 2010-26641

SUMMARY OF THE INVENTION

Problems to be Solved by the Invention

Figure 15:
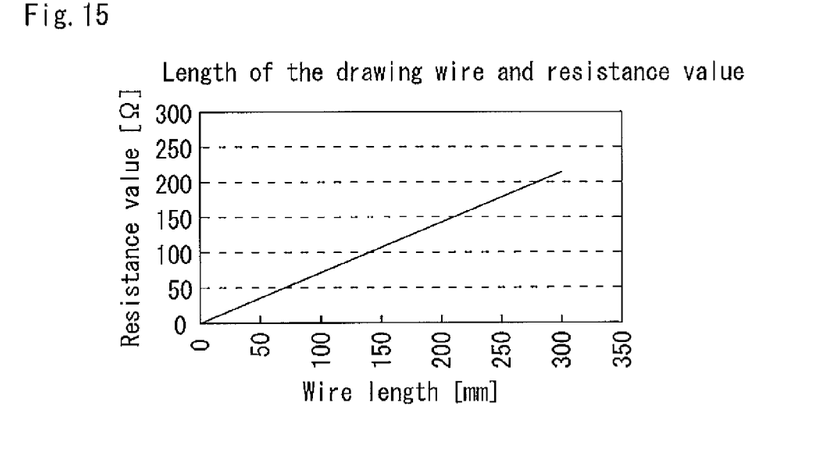
FIG. 15 is a graph indicating a relationship between a circuit length and circuit resistance.

In a conventional multi-touch panel, the circuits connecting the FPC and the respective parallel circuits have different lengths for the respective input areas. As shown in FIG. 15, circuit resistance increases as the circuit length is longer. Therefore, there are generated differences in resistance among the respective wiring circuits, which causes a problem of distortion in an equipotential line.

Figure 16:
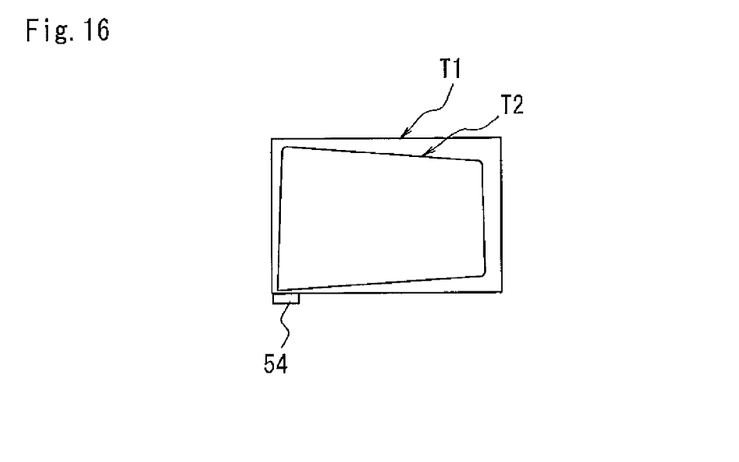
FIG. 16 is an explanatory view showing a state where an equipotential line is distorted.
Figure 17:
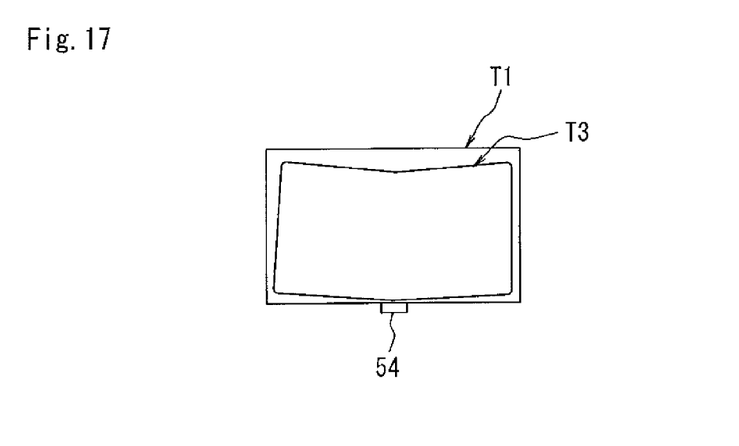
FIG. 17 is an explanatory view showing another state where an equipotential line is distorted.

FIGS. 16 and 17 each show how an equipotential line is distorted depending on the location of the FPC.

In each of these figures, reference sign T1 denotes an ideal equipotential line, while reference signs T2 and T3 each denote a distorted equipotential line. The differences in resistance among the respective wiring circuits increase as the size of the multi-touch panel is larger. Therefore, the distortion of the equipotential line is further increased in a large multi-touch panel.

It has been conventionally performed, in a touch panel, a method for correcting such distortion of an equipotential line with use of a controller. Because a multi-touch panel requires such correction for each input area, correction tasks are complicated and it takes long time to perform such correction tasks.

The differences in resistance among the respective wiring circuits can be reduced by increasing the width of the circuit connected with the parallel circuit that is located far (distal end) from the FPC. However, in a case where there is limitation to the size of a frame portion (see FIG. 13), the width of the circuit can be thickened only to a limited extent. Accordingly, the distortion may not be completely corrected.

The present invention has been achieved in view of the above problems of a conventional multi-touch panel, and an object thereof is to provide a multi-touch panel including an equipotential line distortion corrector that has a simple structure and realizes an equipotential line with no distortion even in a case where drawing wires have different lengths for different input areas.

Solutions to the Problems

In accordance with an aspect of the present invention, a multi-touch panel, characterized by comprising a first substrate provided at an end for receiving coordinate input, a second substrate provided to face the first substrate, a first conductive film formed on the first substrate, and a second conductive film formed on the second substrate, the first conductive film is arranged so as to face the second substrate and the second conductive film is arranged so as to face the first substrate, at least one of the first conductive film and the second conductive film being divided into a plurality of strip regions to configure a plurality of strip electrodes, the strip electrodes each having a first end connected to a drawing wire that starts at the first end and ends at an external terminal provided at a peripheral edge of the first or second substrate, and the strip electrodes each having a second end connected to a drawing wire that starts at the second end and ends at the external terminal, wherein at least one of the first end and the second end of each of the strip electrodes has a narrowed width portion, and the strip electrodes have widths, at the narrowed width portions, different from one another in accordance with lengths of the drawing wires that are connected to the ends provided with the narrowed width portions.

In the present invention, the strip electrodes can have trapezoidal geometry or the like that the width is able to be changed in a longitudinal direction.

In the present invention, each of the narrowed width portions is able to configure by an electrode connection path that is formed by cutting out the strip electrodes in the width direction thereof.

In the present invention, each of the narrowed width portions is able to configure by electrode connection paths that are aligned into a comb shape across the entire width of the strip electrodes.

In the present invention, each of the strip electrodes has parallel circuits at the first end and the second end, respectively, and each of the narrowed width portions is able to form to leave a film end portion for connecting the corresponding strip electrode and the corresponding parallel circuit having same widths.

In the present invention, the external terminal is provided at one end of an arbitrary side of the multi-touch panel, and each of the strip electrodes at the corresponding narrowed width portion can have a width set to be larger as the drawing wire connected to the end provided with the narrowed width portion is longer.

In the present invention, the external terminal is provided at a center of an arbitrary side of the multi-touch panel, and each of the strip electrodes at the corresponding narrowed width portion can have a width set to be larger as the drawing wire connected to the end provided with the narrowed width portion is longer.

Effects of the Invention

The multi-touch panel according to the present invention advantageously realizes in a simple structure an equipotential line with no distortion even in a case where drawing wires for signal extraction have different lengths for different input areas.

EMBODIMENTS OF THE INVENTION

The present invention is described in detail below with reference to the drawings that illustrate embodiments of the present invention.

1. First Multi-Touch Panel According to the Present Invention 1.1 Configuration of First Multi-Touch Panel A first multi-touch panel shown in FIGS. 1(a) and 1(b) is of a type in which an FPC (flexible printed circuit board) is provided at an end of the multi-touch panel.

A first multi-touch panel 1 includes a lower electrode plate (second substrate) 2 and an upper electrode plate (first substrate) 3 which are provided to face each other with a predetermined gap formed therebetween. Peripheral portions of these panels are joined with each other by an adhesive layer (not shown) in a shape of a window frame.

The lower electrode plate 2 has a transparent insulating substrate 4 such as a glass plate, and ITO electrodes (configuring a second conductive film) formed on an upper surface of the transparent insulating substrate 4. The ITO electrodes are configured by strip electrodes 5 forming a plurality of divided strip regions, respectively.

The strip electrodes 5 have ends for signal extraction (ends in an X-X' direction) provided with a plurality of paired parallel circuits 6 to 9, respectively.

The upper electrode plate 3, which is to be touched, has a flexible transparent insulating base material 10 such as a polyester film, and ITO electrodes (configuring a first conductive film) each having a strip shape and formed on a lower surface of the flexible transparent insulating base material 10. The ITO electrodes are configured by strip electrodes 11 forming a plurality of divided strip regions, respectively.

The strip electrodes 11 have ends for signal extraction (ends in a Y-Y' direction) provided with a plurality of paired parallel circuits 12 to 16, respectively.

The parallel circuits 6 to 9 in the lower electrode plate 2 are connected to an FPC 18 functioning as an external terminal, by way of drawing wires 17 that are provided along a peripheral edge of the lower electrode plate 2.

On the other hand, the parallel circuits 12 to 16 in the upper electrode plate 3 are connected to the FPC 18 by way of drawing wires 19 that are provided along a peripheral edge of the upper electrode plate 3.

It is noted that FIGS. 1(a) and 1(b) each show a state where distances between the adjacent parallel circuits are enlarged for the purpose of understanding easier the locations of the parallel circuits and the drawing wires, while each of the actual distances between the adjacent parallel circuits is approximately 0.2 mm.

1.2 Correctors of Upper Electrode Plate

Figure 1:
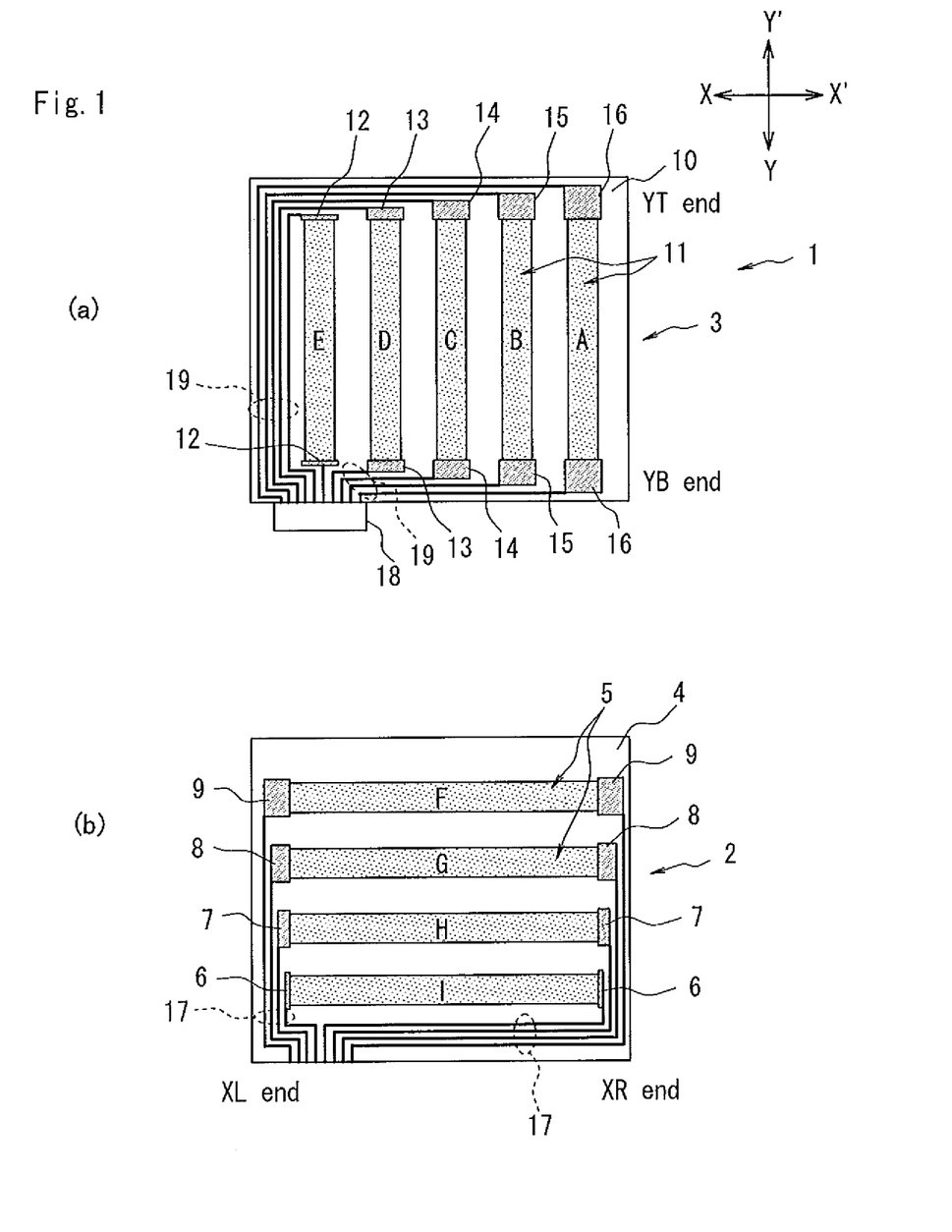
FIGS. 1(a) and 1(b) are exploded plan views each showing a configuration of a first multi-touch panel according to the present invention.
Figure 2:
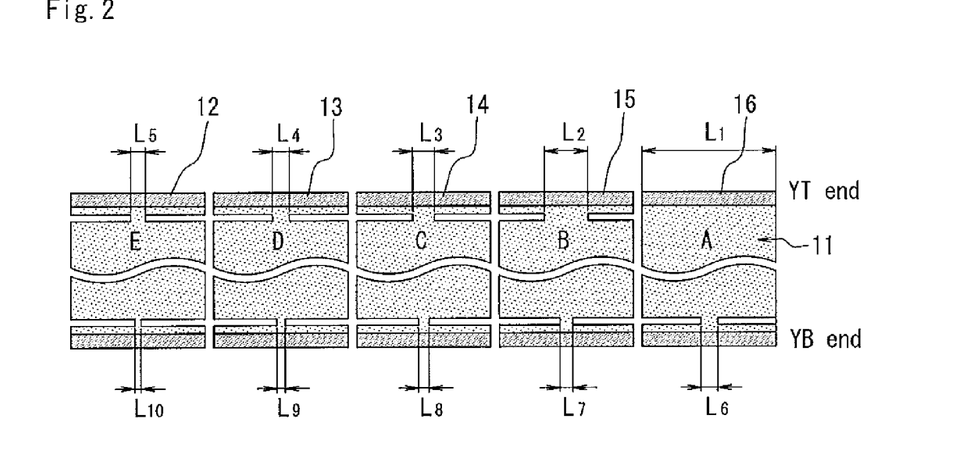
FIG. 2 is an enlarged view of correctors in an upper electrode plate shown in FIG. 1(a)

FIG. 2 is an enlarged view of equipotential line distortion correctors (hereinafter, abbreviated as the correctors) provided in the upper electrode plate 3.

In this figure, the correctors are provided at positions where the strip electrodes are connected with the parallel circuits, respectively. The upper (at a YT end) corrector in an input area A, which is located far from the FPC 18 shown in FIG. 1, has a width equal to a width L1 of an electrode connection path that is provided across the entire width of the strip electrode connected to the parallel circuit 16.

The upper corrector in an input area B has a width equal to a width L2 of an electrode connection path that is narrower than the strip electrode 11 connected to the parallel circuit 16 so as to establish L2<L1. The upper corrector in an input area C has a width equal to a width L3 of an electrode connection path that is further narrower than the strip electrode 11 so as to establish L3<L2. The upper corrector in an input area D has a width equal to a width L4 of an electrode connection path that is still further narrower than the strip electrode 11 so as to establish L4<L3. The upper corrector in an input area E has a width equal to a width L5 of an electrode connection path that is still further narrower than the strip electrode 11 so as to establish L5<L4.

In other words, if the drawing wire is long, the resistance is reduced in the corresponding corrector. On the other hand, if the drawing wire is short, the resistance is increased in the corresponding corrector.

In this manner, the strip electrode 11 connected to the parallel circuit 16 is cut out to be removed by a predetermined width in each of the input areas, so as to adjust the width of the electrode connection path of the strip electrode 11 connected to the parallel circuit 16. This configuration can offset the differences in resistance caused by the differences in length of the drawing wires 19.

Meanwhile, assuming that the length of the circuit wired from the FPC 18 to the upper parallel circuit 12 in the input area E is equal to the length of the circuit wired the lower parallel circuit 16 in the input area A, the lower (at a YB end) corrector in the input area A, which is located close to the FPC 18, has a width equal to a width L6 of an electrode connection path of the corresponding strip electrode so as to establish L6=L5.

The lower corrector in the input area B has a width equal to a width L7 of an electrode connection path that is narrower than the strip electrode so as to establish L7<L6. The lower corrector in the input area C has a width equal to a width L8 of an electrode connection path set so as to establish L8<L7. The lower corrector in the input area D has a width equal to a width L9 of an electrode connection path set so as to establish L9<L8. The lower corrector in the input area E has a width equal to a width L10 of an electrode connection path set so as to establish L10<L9.

Table 1 shown below indicates specific examples of the differences in length of the drawing wires of the upper electrode plate 3, resistance values to be corrected, and the corrected widths of the electrode connection paths.

TABLE 1

|  | YB end | | | | | YT end | | | | |
| --- | --- | --- | --- | --- | --- | --- | --- | --- | --- | --- |
|  | E | D | C | B | A | E | D | C | B | A |
| Difference in wire length [mm] | 0 | 10 | 20 | 30 | 40 | 40 | 50 | 60 | 70 | 80 |
| Resistance value to be corrected [Ω] | 80 | 70 | 60 | 50 | 40 | 40 | 30 | 20 | 10 | 0 |
| Width L of ITO electrode [mm] | $L_{10}$ 0.29 | $L_9$ 0.33 | $L_8$ 0.38 | $L_7$ 0.45 | $L_6$ 0.56 | $L_5$ 0.56 | $L_4$ 0.71 | $L_3$ 1.00 | $L_2$ 1.67 | $L_1$ 5.00 |

1.3 Correctors of Lower Electrode Plate

Figure 3:
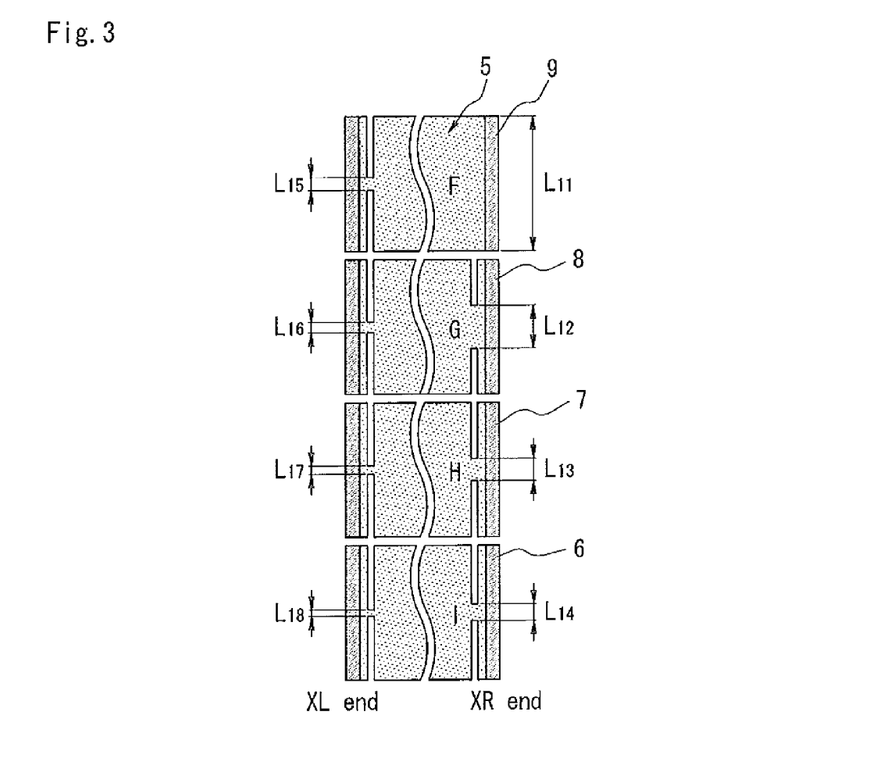
FIG. 3 is an enlarged view of correctors in a lower electrode plate shown in FIG. 1(b).

FIG. 3 is an enlarged view of correctors provided in the lower electrode plate 2.

In this figure, the right (at an XR end) corrector in an input area F, which is located far from the FPC 18, has a width equal to a width L11 of an electrode connection path that is provided across the entire width of the strip electrode 5 connected to the parallel circuit 9.

The right corrector in an input area G has a width equal to a width L12 of an electrode connection path narrowed so as to establish L12<L11. The right corrector in an input area H has a width equal to a width L13 of an electrode connection path further narrowed so as to establish L13<L12. The right corrector in an input area I has a width equal to a width L14 of an electrode connection path still further narrowed so as to establish L14<L13.

Meanwhile, the left (at an XL end) corrector in the input area F, which is located close to the FPC 18, has a width equal to a width L15 of the corresponding strip electrode so as to establish L15<L14.

The left corrector in the input area G has a width equal to a width L16 of an electrode connection path narrowed so as to establish L16<L15. The left corrector in the input area H has a width equal to a width L17 of an electrode connection path set so as to establish L17<L16. The left corrector in the input area I has a width equal to a width L18 of an electrode connection path set so as to establish L18<L17.

Table 2 shown below indicates specific examples of the differences in length of the drawing wires of the lower electrode plate 2, resistance values to be corrected, and the corrected widths of the electrode connection paths.

TABLE 2

|  | XL end | | | | XR end | | | |
| --- | --- | --- | --- | --- | --- | --- | --- | --- |
|  | I | H | G | F | I | H | G | F |
| Difference in wire length [mm] | 0 | 10 | 20 | 30 | 50 | 60 | 70 | 80 |
| Resistance value to be corrected [Ω] | 80 | 70 | 60 | 50 | 30 | 20 | 10 | 0 |
| Width L of ITO electrode [mm] | $L_{18}$ 0.29 | $L_{17}$ 0.33 | $L_{16}$ 0.38 | $L_{15}$ 0.45 | $L_{14}$ 0.71 | $L_{13}$ 1.00 | $L_{12}$ 1.67 | $L_{11}$ 5.00 |

2. Second Multi-Touch Panel According to the Present Invention 2.1 Configuration of Second Multi-Touch Panel A second multi-touch panel 20 shown in FIGS. 4(*a*) and 4(*b*) is of a type in which the FPC is provided at a center of the multi-touch panel. In these figures, the components same as those of FIGS. 1(*a*) and 1(*b*) are denoted by identical reference signs, and description of such components will not be repetitively provided.

Figure 4:
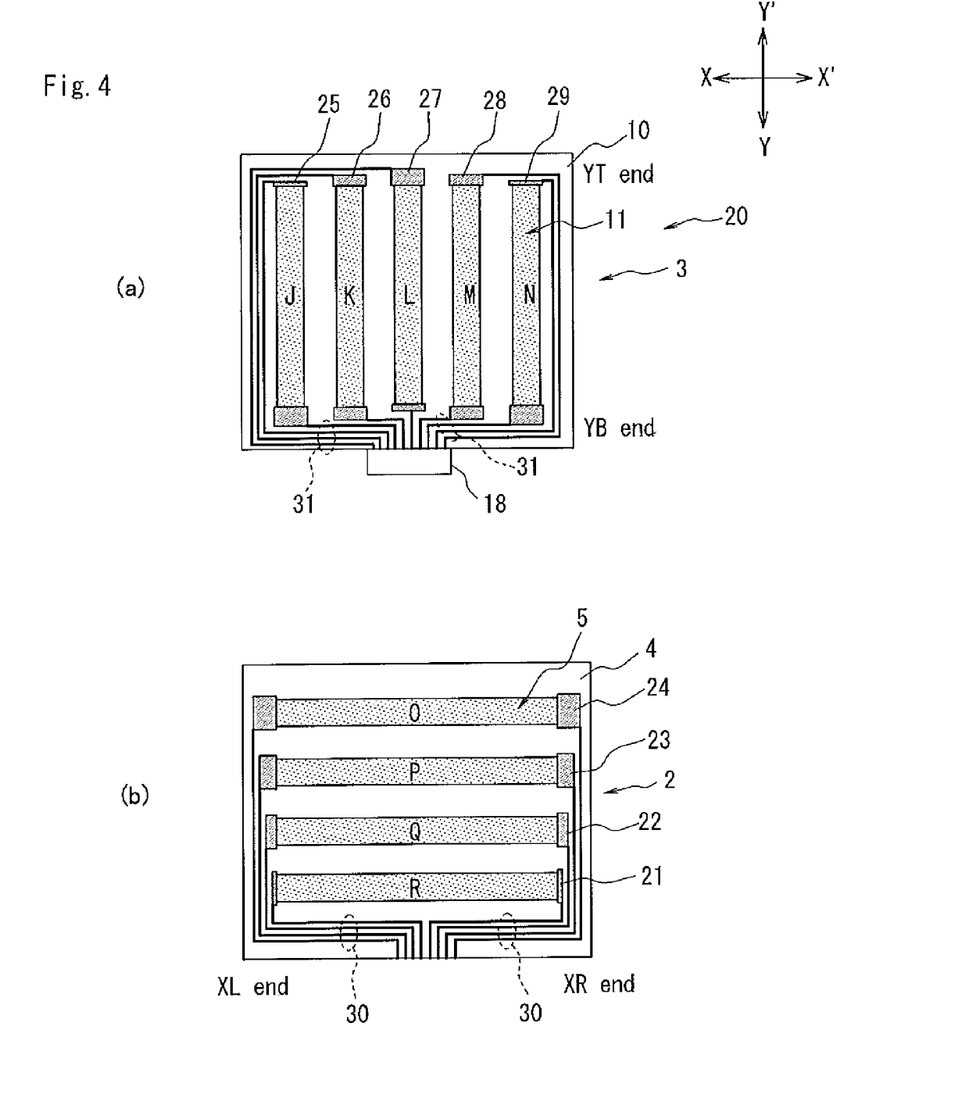
FIGS. 4(a) and 4(b) are exploded plan views each showing a configuration of a second multi-touch panel according to the present invention.

In FIG. 4, the strip electrodes 5 in the lower electrode plate 2 have the ends in the X-X' direction provided with a plurality of paired parallel circuits 21 to 24, respectively.

The parallel circuits 21 to 24 are connected to the FPC 18 by way of drawing wires 30 that are provided along the peripheral edge in the transverse direction of the lower electrode plate 2.

On the other hand, the strip electrodes 11 in the upper electrode plate 3 have the ends in the Y-Y' direction provided with a plurality of paired parallel circuits 25 to 29, respectively.

The parallel circuits 25 to 29 are connected to the FPC 18 by way of drawing wires 31 that are provided along the peripheral edge in the transverse direction of the upper electrode plate 3.

2.2 Correctors of Upper Electrode Plate

Figure 5:
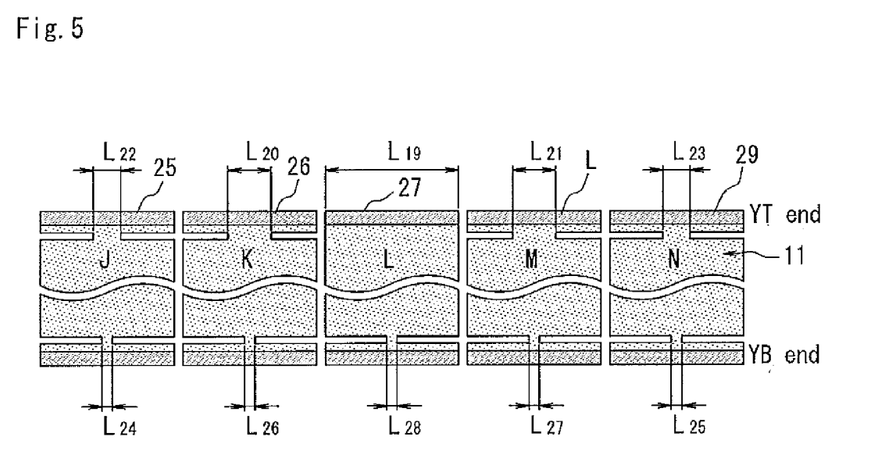
FIG. 5 is an enlarged view of correctors in an upper electrode plate shown in FIG. 4(a)

FIG. 5 is an enlarged view of the correctors provided in the upper electrode plate 3.

In this figure, the upper (at the YT end) corrector in a central input area L, which is located farthest from the FPC 18, has a width equal to a width L19 of an electrode connection path that is provided across the entire width of the strip electrode 11.

The upper correctors in input areas K and M respectively have widths equal to widths L20 and L21 of electrode connection paths narrowed so as to establish (L20=L21)<L19.

The upper correctors in input areas J and N respectively have widths equal to widths L22 and L23 of electrode connection paths further narrowed so as to establish (L22=L23) <L20.

Meanwhile, at the lower (at the YB end) connection portions in the input areas J and N, electrode connection paths have widths L24 and L25 set to be equal to each other.

At the lower connection portions in the input areas K and M, electrode connection paths have widths L26 and L27 set to be equal to each other, so as to establish (L26=L27)< (L24=L25).

Further, at the lower connection portion in the input area L, an electrode connection path has a width L28 set so as to establish L28<(L26=L27).

Table 3 shown below indicates specific examples of the differences in length of the drawing wires of the upper electrode plate 3, resistance values to be corrected, and the corrected widths of the electrode connection paths.

TABLE 3

|  | YB end | | | | | YT end | | | | |
| --- | --- | --- | --- | --- | --- | --- | --- | --- | --- | --- |
|  | J | K | L | M | N | J | K | L | M | N |
| Difference in wire length [mm] | 20 | 10 | 0 | 10 | 20 | 70 | 80 | 90 | 80 | 70 |
| Resistance value to be corrected [Ω] | 70 | 80 | 90 | 80 | 70 | 20 | 10 | 0 | 10 | 20 |
| Width L of ITO electrode [mm] | $L_{24}$ 0.33 | $L_{26}$ 0.29 | $L_{28}$ 0.26 | $L_{27}$ 0.29 | $L_{25}$ 0.33 | $L_{22}$ 1.00 | $L_{20}$ 1.67 | $L_{19}$ 5.00 | $L_{21}$ 1.67 | $L_{23}$ 1.00 |

2.3 Correctors of Lower Electrode Plate

Figure 6:
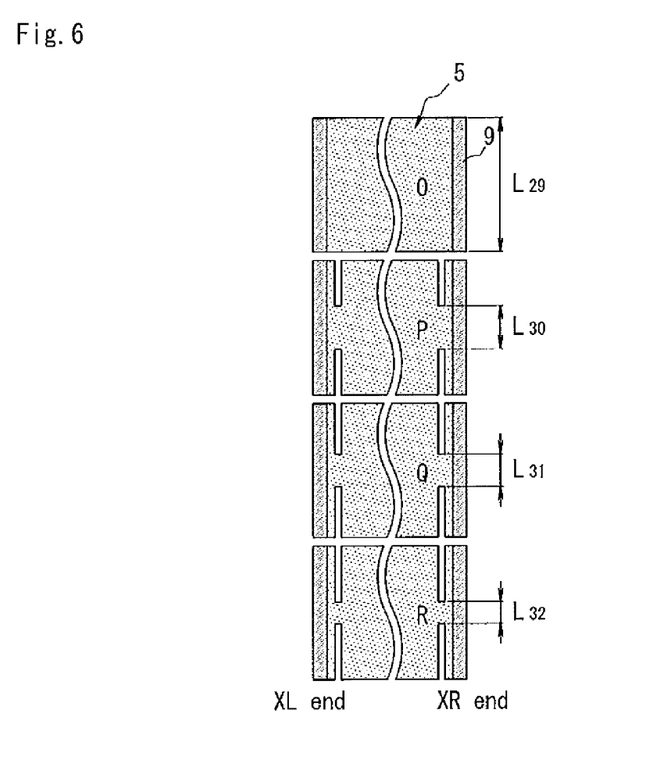
FIG. 6 is an enlarged view of correctors in a lower electrode plate shown in FIG. 4(b).

FIG. 6 is an enlarged view of the correctors provided in the lower electrode plate 2.

In this figure, the right (at the XR end) corrector and the left (at the XL end) corrector in an input area O, which are located far from the FPC 18, each have a width equal to a width L29 of an electrode connection path that is provided across the entire width of the strip electrode 5.

At each of the right corrector and the left corrector in an input area P, an electrode connection path has a width L30 set so as to establish L30<L29. At each of the right corrector and the left corrector in an input area Q, an electrode connection path has a width L31 set so as to establish L31<L30. At each of the right corrector and the left corrector in an input area R, an electrode connection path has a width L32 set so as to establish L32<L31.

Table 4 shown below indicates specific examples of the differences in length of the drawing wires of the lower electrode plate 2, resistance values to be corrected, and the corrected widths of the electrode connection paths.

TABLE 4

|  | XL end | | | | XR end | | | |
|---|---|---|---|---|---|---|---|---|
|  | R | Q | P | O | R | Q | P | O |
| Difference in wire length [mm] | 0 | 10 | 20 | 30 | 0 | 10 | 20 | 30 |
| Resistance value to be corrected [Ω] | 30 | 20 | 10 | 0 | 30 | 20 | 10 | 0 |
| Width L of ITO electrode [mm] | $L_{32}$ 0.71 | $L_{31}$ 1.00 | $L_{30}$ 1.67 | $L_{29}$ 5.00 | $L_{32}$ 0.71 | $L_{31}$ 1.00 | $L_{30}$ 1.67 | $L_{29}$ 5.00 |

Figure 7:
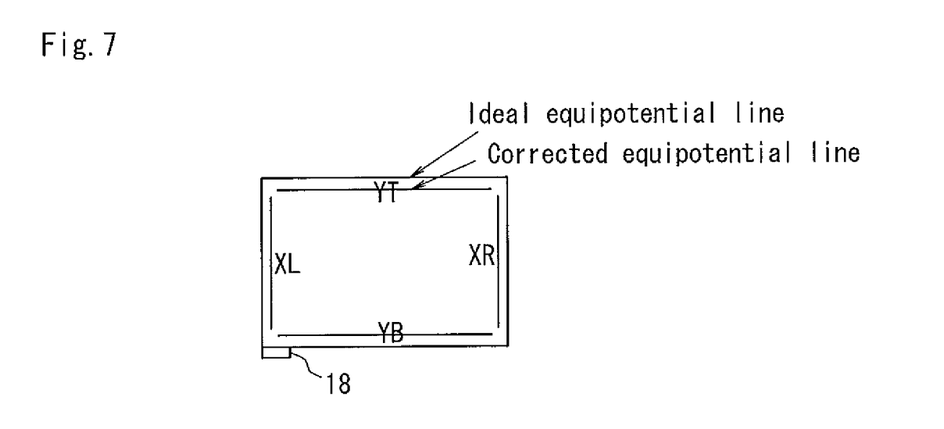
FIG. 7 is an explanatory view showing an equipotential line obtained by the first multi-touch panel according to the present invention.
Figure 8:
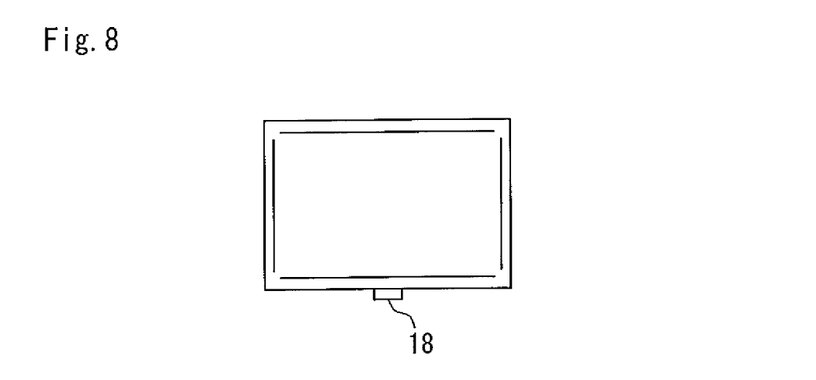
FIG. 8 is an explanatory view showing an equipotential line obtained by the second multi-touch panel according to the present invention.

FIG. 7 is a view showing an image of an equipotential line obtained by the first multi-touch panel, and FIG. 8 is a view showing an image of an equipotential line obtained by the second multi-touch panel.

As shown in these figures, both in the case where the FPC 18 is located at an end of the multi-touch panel and in the case where the FPC 18 is located at the center thereof, the equipotential line obtained by the multi-touch panel including the correctors described above is along an ideal equipotential line.

3. Examples of Formation of Corrector

FIGS. 9 to 12 respectively show examples of forming a corrector.

Figure 9:
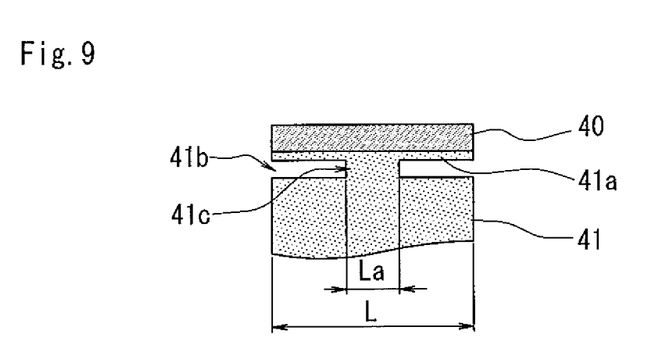
FIG. 9 is an explanatory view showing a first example of forming a corrector according to the present invention.

In a first formation example shown in FIG. 9, a parallel circuit 40 and an ITO film 41 having same widths are connected with each other, and the ITO film 41 is provided, along the parallel circuit 40, with ITO removed portions 41b that are cut out so as to be laterally concave on right and left sides of the ITO film 41. Accordingly, there is formed a corrector 41c that is configured by an electrode connection path having a width La narrower than a width L of the ITO film 41.

The corrector 41c shown in this figure has an ITO film end portion 41a that is identical in width with the ITO film 41, and the parallel circuit 40 is laminated on the ITO film end portion 41a. There is thus no risk of change in resistance value, which may be caused by displacement between the corrector 41c and the parallel circuit 40. Moreover, advantageously secured is durability of the ITO film 41a at the corrector.

Figure 10:
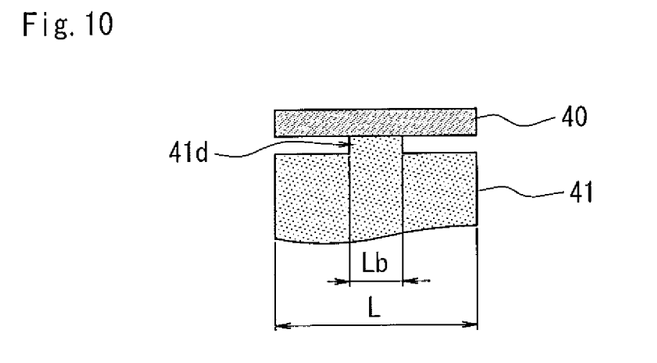
FIG. 10 is an explanatory view showing a second example of forming a corrector according to the present invention.

In a second formation example shown in FIG. 10, a corrector 41d, which is configured by an electrode connection path having a width Lb narrower than the width L of the ITO film 41, is connected directly to the parallel circuit 40.

The corrector shown in this figure does not require the ITO film end portion 41a shown in FIG. 9. Therefore, the frame portion (see FIG. 13) can be advantageously reduced in size.

Figure 11:
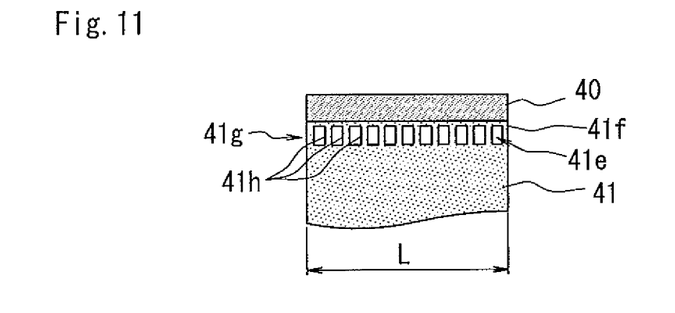
FIG. 11 is an explanatory view showing a third example of forming a corrector according to the present invention.

In a third formation example shown in FIG. 11, the parallel circuit 40 and the ITO film 41 having same widths are connected with each other, and the ITO film 41 is cut out along the parallel circuit 40 in the vicinity of the parallel circuit so as to form window frame shapes configuring a large number of openings 41e, which narrow the width L of the ITO film 41.

A corrector 41g shown in this figure has an ITO film end portion 41f that is identical in width with the ITO film 41, and the parallel circuit 40 is laminated on the ITO film end portion 41f. There is thus no risk of change in resistance value, which may be caused by displacement between the corrector 41g and the parallel circuit 40. Further, the corrector 41g has electrode connection paths 41h that are aligned across the entire width of the ITO film 41. Therefore, input is advantageously accepted even in the area provided with the corrector 41g.

Figure 12:
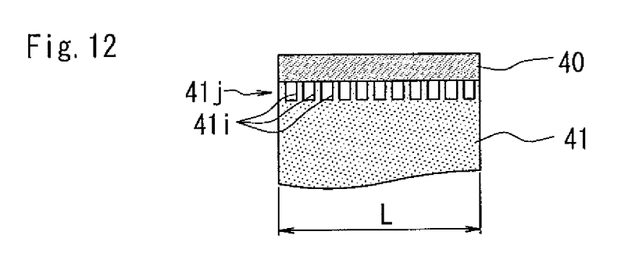
FIG. 12 is an explanatory view showing a fourth example of forming a corrector according to the present invention.

In a fourth formation example shown in FIG. 12, a corrector 41j, in which a large number of electrode connection paths 41i are aligned into a comb shape, is connected directly to the parallel circuit 40.

The corrector 41j shown in this figure has the electrode connection paths 41i that are aligned across the entire width of the ITO film 41, similarly to the electrode connection paths 41h shown in FIG. 11. Accordingly, input is accepted even in the area provided with the corrector 41j. Furthermore, the corrector 41j does not require the ITO film end portion 41f shown in FIG. 11. Therefore, the frame portion can be reduced in size.

The present invention should not be originally limited by the embodiments having been described, but can be certainly carried out with any appropriate modifications within a range applicable to the purposes of the present invention. Such modifications shall be included in the technical scope of the present invention.

INDUSTRIAL APPLICABILITY

The present invention is applicable to a multi-touch panel in which distortion of an equipotential line is corrected.

| DESCRIPTION OF REFERENCE SIGNS | |
|---|---|
| 1 | Multi-touch panel |
| 2 | Lower electrode plate |
| 3 | Upper electrode plate |
| 4 | Transparent insulating substrate |
| 5 | Strip electrode |
| 6 to 9 | Parallel circuit |
| 10 | Flexible transparent insulating base material |
| 11 | Strip electrode |
| 12 to 16 | Parallel circuit |
| 17 | Drawing wire |
| 18 | FPC (External terminal) |
| 19 | Drawing wire |
| 20 | Second multi-touch panel |
| 21 to 24 | Parallel circuit |
| 25 to 29 | Parallel circuit |
| 30 | Drawing wire |
| 31 | Drawing wire |

The invention claimed is:

1. A multi-touch panel comprising:
   a first substrate provided at an end for receiving coordinate input;
   a second substrate provided to face the first substrate;
   a first conductive film formed on the first substrate; and
   a second conductive film formed on the second substrate;
   the first conductive film is arranged so as to face the second substrate and the second conductive film is arranged so as to face the first substrate,
   at least one of the first conductive film and the second conductive film being divided into a plurality of strip regions to configure a plurality of strip electrodes,
   the strip electrodes each having a first end connected to a drawing wire that starts at the first end and ends at an external terminal provided at a peripheral edge of the first or second substrate, and the strip electrodes each having a second end connected to a drawing wire that starts at the second end and ends at the external terminal, wherein at least one of the first end and the second end of each of the strip electrodes has a narrowed width portion, and the strip electrodes have widths, at the narrowed width portions, different from one another in accordance with lengths of the drawing wires that are connected to the ends provided with the narrowed width portions.

2. The multi-touch panel according to claim 1, wherein each of the narrowed width portions is configured by an electrode connection path that is formed by cutting out the strip electrodes in the width direction thereof.

3. The multi-touch panel according to claim 1, wherein each of the narrowed width portions is configured by electrode connection paths that are aligned into a comb shape across the entire width of the strip electrodes.

4. The multi-touch panel according to claim 2, wherein each of the strip electrodes has parallel circuits at the first end and the second end, respectively, and each of the narrowed width portions is formed to leave a film end portion for connecting the corresponding strip electrode and the corresponding parallel circuit having same widths.

5. The multi-touch panel according to claim 1, wherein the external terminal is provided at one end of an arbitrary side of the multi-touch panel, and each of the strip electrodes at the corresponding narrowed width portion has a width set to be larger as the drawing wire connected to the end provided with the narrowed width portion is longer.

6. The multi-touch panel according to claim 1, wherein the external terminal is provided at a center of an arbitrary side of the multi-touch panel, and each of the strip electrodes at the corresponding narrowed width portion has a width set to be larger as the drawing wire connected to the end provided with the narrowed width portion is longer.

* * * * *